United States Patent

[11] 3,627,872

| [72] | Inventor | Thomas M. Parkinson |
| | | Portage, Mich. |
| [21] | Appl. No. | 719,670 |
| [22] | Filed | Apr. 8, 1968 |
| [45] | Patented | Dec. 14, 1971 |
| [73] | Assignee | The Upjohn Company |
| | | Kalamazoo, Mich. |
| | | Continuation-in-part of application Ser. No. 451,978, Apr. 29, 1965, now abandoned. This application Apr. 8, 1968, Ser. No. 719,670 |

[54] ORAL TREATMENT OF HYPERCHOLESTEREMIA IN MAMMALS AND BIRDS WITH ETHER-TYPE ANION EXCHANGERS OF POLYSACCHARIDES
6 Claims, No Drawings

| [52] | U.S. Cl. | 424/79, 424/180 |
| [51] | Int. Cl. | A61k 27/00 |
| [50] | Field of Search | 424/79, 180 |

[56] References Cited
UNITED STATES PATENTS

| 3,002,823 | 10/1961 | Flodin et al. | 260/209 X |
| 3,107,203 | 10/1963 | Baumgarten et al. | 260/209 X |
| 3,277,025 | 10/1966 | Flodin et al. | 260/233.3 X |

OTHER REFERENCES

Chemical Abstracts 54: 15260 (1960).
Chemical Abstracts 55: 406 (1961).

*Primary Examiner*—Albert T. Meyers
*Assistant Examiner*—Vera C. Clarke
*Attorneys*—Joseph K. Andonian, John Kekich and Roman Saliwanchik ABSTRACT: Processes of orally treating hypercholesteremia in mammals and birds. Ether-type anion exchangers based on polysaccharides and cross-linked polysaccharides are orally administered to hypercholesteremic mammals such as humans and animals, such as dogs; and birds, such as cockerels, in the amelioration and control of hypercholesteremic affections.

ORAL TREATMENT OF HYPER-CHOLESTEREMIA IN MAMMALS AND BIRDS WITH ETHER-TYPE ANION EXCHANGERS OF POLYSACCHARIDES

CROSS REFERENCE TO RELATED APPLICATION

This application is a continuation-in-part of copending application Ser. No. 451,978, filed Apr. 29, 1965, and now abandoned.

BRIEF SUMMARY OF THE INVENTION

This invention relates to the concept of orally administering to hypercholesteremic mammalian and bird subjects an effective amount of ether-type anion exchanger prepared from hydroxyl-containing polysaccharides and cross-linked polysaccharides. The anion exchangers contain amino, morpholino and guanido (guanidino) basic functioning groups. The polysaccharides are dextran, cellulose, hydroxyethyl cellulose and starch and cross-linked polysaccharides prepared therefrom. The anion exchangers are administered orally as such or suitably compounded with edible pharmaceutical carriers.

DETAILED DESCRIPTION

In accordance with the manner and process of making and using this invention, anion exchangers based on polysaccharides and on cross-linked polysaccharides suitably compounded with edible pharmaceutical carriers, are orally administered to mammals including humans and animals and to birds to ameliorate and combat hypercholesteremia.

Blood sterol levels, due mainly to cholesterol, bear a relationship to the frequency of atherosclerosis and accompanying clinical complications such that compositions and processes for reducing hypercholesteremia are much to be desired. Heretofore, oily compositions of unsaturated fatty acids and processes of their administration have been used for reducing hypercholesteremia; however such compositions and processes are generally unsatisfactory due to unacceptable taste, especially upon repeated oral administration, and due to undesirable stimulation of the intestinal tract. Moreover, oily substances do not easily lend themselves to incorporation into satisfactory solid unitary dosage forms for oral administration in that special techniques in formulation are required. Other orally administered compositions, although not oily in nature, are often objectionable due to unsatisfactory and unacceptable taste or odor, for example, quaternary ammonium anion exchangers based on polymeric resins.

It has now been found in accordance with the present invention that ether-type anion exchangers based on hydroxyl group-containing polysaccharides and polymerized hydroxyl group-containing polysaccharides, including dextran and cellulose can be advantageously used in pharmaceutical compositions and processes for lowering hypercholesteremia and reducing serum bile acids, in the absence of the aforesaid undesirable and unsatisfactory properties. Uncharged hydroxyl group-containing polysaccharides such as dextrans and celluloses are generally poorly operable in reducing sterol levels of the blood and in binding cholic acids, but it has not been found that such desirable properties are directly related to exchange capacity alone. Hence, although the exact mechanism of the favorable results with the instant invention is uncertain, it appears that the chemical nature of the cationic functional group, the polymer skeleton, physical properties, and particle size are all related to the presently discovered desirable properties.

The anion exchangers used in the embodiments of this invention are based on dextran, starch, cellulose, hydroxyethyl cellulose, and on cross-linked reaction products prepared from these polysaccharides.

To prepare the cross-linked products, some of which are know, these polysaccharides can be copolymerized, as in U.S. Pat. No. 3,022,823, with bifunctional organic substances containing halogen atoms and/or epoxy groups, for example epichlorohydrin (three carbon atoms), dichlorohydrin (three carbon atoms), diepoxy-butane (1,2:3,4-diepoxybutane) (four carbon atoms), bis-epoxypropyl ether (six carbon atoms), ethylene glycol bis-epoxypropyl ether (eight carbon atoms), and 1,4-butanediol-bis-epoxypropyl ether (10 carbon atoms). The copolymerized reaction products contain covalent linkages in the form of ether bridges of the general type —O—X—O— wherein X represents an aliphatic radical containing 3 to 10 carbon atoms inclusive. An illustrative copolymerized product commercially available as Sephadex is obtained by reacting dextran with epichlorohydrin to yield a copolymerized product containing ether bridges of the type —O—$CH_2CH(OH)CH_2$—O— and a content of hydroxyl groups of about 15 percent by weight. The water regain value (Per Flodin, Dextran Gels and Their Application in Gel Filtration, Halmstad, 1962, Meijels Bokindustri, Sweden) is within the range of about 1 to about 50 g. per g. of dry weight. A similar copolymer is obtained by reacting potato starch and epichlorohydrin, yielding a product with a water regain value within the range of 10 to 50 g. per g. of dry weight. Other copolymers are obtained by reacting the other hydroxyl group-containing polysaccharides with the aforesaid bifunctional compounds. Hence, the cross-linked copolymers are reaction products of dextran, starch, cellulose and hydroxyethyl cellulose, with each of the aforesaid epichlorohydrin, dichlorohydrin, diepoxybutane, bis-epoxypropyl ether, ethylene glycol-bis-epoxypropyl ether, and 1,4-butanediol-bis-epoxypropyl ether. The reaction products contain ether bridges of the type —O—X—O—, X being an aliphatic radical having three to 10 carbon atoms, inclusive, for example from epichlorohydrin and dichlorohydrin, the radical is —$CH_2CHOHCH_2$—; with diepoxybutane —$CH_2CHOHCHOHCH_2$—; with bis-epoxypropyl ether, —$CH_2CHOHCH_2OCH_2CHOHCH_2$—; with ethylene glycol bis-epoxypropyl ether, —$CH_2CHOHCH_2OCH_2CH_2OCH_2CHOHCH_2$—; and with the butanediol bis-epoxypropyl ether, —$CH_2CHOHCH_2O(CH_2)_4OCH_2$—$CHOHCH_2$—. Each of the hydroxyl group-containing polysaccharides can be reacted with each of these bifunctional organic substances to yield the corresponding cross-linked reaction product with the ether bridges having the respective number of carbon atoms, for example the reaction product of dextran and epichlorohydrin containing the aliphatic radical —$CH_2CHOHCH_2$— linked through ether linkages to the residues of the dextran moieties.

Illustratively, to provide suitable ether-type basic functioning exchangers utilized in the process of the present invention, the aforesaid hydroxyl group-containing polysaccharides and the reaction products of such hydroxyl group-containing polysaccharides and bifunctional compounds are processed by methods known in the art, for example that of Peterson and Sober, J. Am. Chem. Soc. 78:751-755, Feb. 20, 1956; McKernan and Ricketts, Chem. and Industry, Nov. 21, 1959, pp. 1490 —1491; and U.S. Pat. No. 3,277,025. Peterson and Sober describe as an anion exchanger the reaction product (Ecteolacellulose) containing basic groups derived from triethanolamine bound to cellulose through reaction with epichlorohydrin. They also describe the preparation of a diethylaminoethyl anion exchange ether of cellulose (DEAE–cellulose) prepared from cellulose and 2-chlorotriethylamine in the presence of sodium hydroxide. McKernan and Ricketts describe the preparation of diethylaminoethyl ethers of dextran (DEAE–dextran) utilizing, as do Peterson and Sober, 2-chlorotriethylamine in the presence of sodium hydroxide. U.S. Pat. No. 3,277,025 describes the preparation of anion exchangers from cross-linked dextran, cross-linked starch, cross-linked cellulose and cross-linked hydroxyethyl cellulose, and cross-linked polyvinyl alcohol utilizing the cross-linked product and chloro- or bromo-substituted tertiary amines or salts thereof, such as:
 diethylaminoethylchloride,
 diethylaminoethylbromide,
 dimethylaminoethylchloride,
 dimethylaminoethylbromide,
 diethylaminomethylchloride,
 diethylaminomethylbromide, dimethylaminomethylchloride,
dimethylaminomethylbromide,
di-(hydroxyethyl)-aminoethylchloride,
di-(hydroxyethyl)-aminoethylbromide,
di-(hydroxyethyl)-aminomethylchloride,
di-(hydroxyethyl)-aminomethylbromide,
β-morpholinoethylchloride,
β-morpholinoethylbromide,
Morpholinomethylchloride,
Morpholinomethylbromide.

Illustratively, anion exchange ethers prepared from the copolymerized hydroxyl group-containing polysaccharides are: diethylaminoethyl ether of the reaction product of epichlorohydrin and dextran, dimethylaminoethyl ether of the reaction product of diepoxybutane and starch, diethylaminomethyl ether of the reaction product of bis-epoxypropyl ether and cellulose, dimethylaminomethyl ether of the reaction product of ethylene glycol bis-epoxypropyl ether and hydroxyethyl cellulose, and the like. Unpolymerized hydroxyl-containing polysaccharides such as dextran, starch, cellulose and hydroxyethyl cellulose can also be reacted with the aforesaid amines to yield the corresponding anion exchangers which are also useful in the process of this invention. Illustratively, the anion exchange ethers prepared from the unpolymerized hydroxyl group-containing polysaccharides are: diethylaminoethyl ether of dextran, dimethylaminoethyl ether of starch, diethylamino-methyl ether of cellulose and dimethylaminomethyl ether of hydroxyethyl cellulose, and the like.

Additional basic functioning anion exchangers of the ether type based on the polysaccharides and copolymerized polysaccharides are the aminoethyl ethers, for example, aminoethylcellulose prepared from 2-aminoethyl sulfuric acid and cellulose powder in the presence of sodium hydroxide, Semenza, Helv. Chim. Acta 43:1057 (1960); the guanidinoethyl ethers, for example guanidinoethyl cellulose prepared from aminoethyl cellulose and O-methyl isourea in buffered solution at pH, Semenza, Ibid.; and the p-aminobenzyl ethers, for example p-aminobenzyl cellulose prepared by converting cellulose to the p-nitrobenzyl derivative and reducing the nitro group, Campbell et al., Proc. Nat. Acad. Sci. 37:575 (1951).

Additional examples of the basic functioning anion exchange ethers of the copolymerized polysaccharides are: the aminoethyl ether of cross-linked dextran and the guanidinoethyl ether of cross-linked hydroxyethyl cellulose, cross-linked as aforesaid with the bifunctional organic substances.

The term "dextran" herein means native dextran, an anhydroglucose polymer produced by numerous strains of *Leuconostoc* and closely related bacteria in sucrose-containing solutions. Most of the glucosidic linkages are α—D—1→6 but to a lesser extent 1→3- and 1→4-linkages also appear. The presence of these non-1→6-linkages is evidence of the branching of the chains. A preferred dextran is that produced by *Leuconostoc mesenteroides* having 5 to 10 percent of non-1→6-linkages. In its native form the dextran is soluble in water. As used herein the term "cross-linked" refers to water-insoluble polymers containing ether bridges and hydroxyl groups prepared from the polysaccharides by reaction with bifunctional compounds as disclosed in U.S. Pat. No. 3,002,823. To provide the herein utilized ether-type exchangers based on native and cross-linked dextran, ether linkages and amino groups are introduced into these substances for example according to the method of Peterson and Sober, described by McKernan and Ricketts, Chemistry and Industry, Nov. 21, 1959, pp. 1490 —1491. Therein the diethylaminoethyl ether of native dextran is prepared by reaction with 2-chlorotriethylamine. Also, a method for preparation of the hydrochloride salt thereof is set forth. The method of McKernan and Ricketts is based on that of Peterson and Sober, J. Am. Chem. Soc. 78:751-755, Feb. 20, 1956.

The term "cellulose" means purified cellulose, e.g., purified wood cellulose referred to by Peterson and Sober. Cellulose can also be cross-linked by reaction with bifunctional groups as in U.S. Pat. No. 3,002,823, aforesaid. Both cellulose and cross-linked cellulose, aforesaid, can be etherified and basic functioning amino groups can be added according to the methods of McKernan et al. and Peterson et al., supra.

A variety of epichlorohydrin cross-linked dextran is that known as Sephadex, (Per Flodin, Dextran Gels and Their Application in Gel Filtration, Halmstad, 1962, Meijels Bokindustri, Sweden). The available types are of differing water regain values, e.g., G–25, 2.5 g. per g.; G–50, 5.0 g. per g.; and G–100, 10 g. per g. An operable diethylaminoethyl ether of this cross-linked dextran is that known as DEAE–Sephadex. It is available with differing porosities as DEAE–Sephadex A–25 and A–50. These products are available from Pharmacia Fine Chemicals, Inc., Piscataway, New Market, New Jersey. The basic functioning ether of native dextran, DEAE dextran, is also available from this source. Operable basic functioning ethers of cellulose, diethylaminoethyl (DEAE) cellulose, aminoethyl (AE) cellulose, guanidoethyl (GE) cellulose, and p-aminobenzyl (PAB) cellulose are conveniently available from Gallard-Schlesinger Chemical Mfg. Corp., Carle Place, Long Island, New York. The hydrochloride salts of the dextrans and celluloses are preferred, although the bases are operable.

Hence, the present invention provides pharmaceutical preparations for oral administration comprising suitably an edible pharmaceutical carrier and as essential active ingredient an anion exchange ether of the polysaccharides and of the aforesaid cross-linked polysaccharides, including dextran or cellulose, wherein the exchanger function is selected from the group consisting of amino (primary, secondary and tertiary), morpholino and guanidino. Examples of such exchangers are the following ethers of dextran and cellulose, including native dextran and cross-linked dextran, as heretofore described; and native cellulose and cross-linked cellulose, as heretofore described: diethylaminoethyl ether, aminoethyl ether, guanidoethyl ether, and p-aminobenzyl ether. Each member of this group of exchange ethers is operable in the preparations and processes of the instant invention. Diethylaminoethyl cellulose, guanidoethyl cellulose, and the diethylaminoethyl dextrans are preferred, and diethylaminoethyl Sephadex and diethylaminoethyl native dextran are especially preferred.

The term "edible oral carrier" means the diluents, excipients, aqueous vehicles, oily vehicles, binders, disintegrators and lubricants used by those skilled in the art in preparing oral dosage forms and products, for example capsules, gels, magmas, powders, solutions, emulsions, suspensions, granules, and tablets. It also means animal and bird rations comprising the usual dietary ingredients, i.e., carbohydrate, fat, minerals, protein and vitamins, e.g. the diet for cockerels, Tennent et al., Proc. Soc. Exp. Biol. Med. 96:679, 1957, and comparable rations for dogs.

The essential active ingredient in the aforesaid pharmaceutical preparations for oral administration is administered in various amounts, depending upon the weight of the mammals and birds under treatment, for example humans, animals, e.g. dogs, and birds, e.g. chickens, under treatment. For example, in human subjects the daily dosage ranges from about 2 g. to about 100 g., preferably from about 10 g. to about 15 g. The preferred method of oral administration is four times per day with each dosage ranging from about 0.5 g. to about 25 g., preferably from about 2.5 g. to about 3.75 g. It is preferred to use a particle size of from about 200 to about 500 mesh.

It is especially advantageous to compound the pharmaceutical preparations in unitary dosage form for ease of administration and uniformity of dosage. "Unitary dosage form," as used in the specification and claims herein, means those physically discrete forms suitable in unitarily dosing the subjects, each form containing a predetermined quantity of the essential active ingredient, suitably in association with an edible pharmaceutical carrier. Examples of the unitary dosage forms are capsules, dropperfuls, teaspoonfuls, tablespoonfuls, including segregated multiples of the dropperfuls, teaspoonfuls and tablespoonfuls, powders and tablets. In addition to the said unitary dosage forms heretofore described, the preparations for oral administration can be in the form of biscuits, bread, cookies, animal and bird rations, and the like, into which the essential active ingredient has been incorporated in accordance with the aforesaid dosage ranges. Especially preferred among the unitary dosage forms are capsules of the hard soluble gelatin type and compressed tablets. The preparations and processes of oral administration of the present invention are advantageously useful in reducing hypercholesteremia without undesirable unacceptable taste or odor and overstimulation of the intestinal tract of the subject receiving treatment. In reducing cholesteremia, various physiological mechanisms are postulated such as increased excretion, decreased absorption, decreased biosynthesis, and increased oxidation to bile acids. Experimental data obtained in connection with the present invention indicate that the preferred essential active ingredient provides advantageous results by binding and immobilizing bile acids.

Complementary active ingredients suitable for addition to the compositions and processes include, for example, unsaturated fatty acids such as linoleic acid, arachidonic acid, and linolenic acid; edible vegetable oils, such as corn oil and safflower oil; inhibitors of endogenous cholesterol synthesis, such as nafoxidine hydrochloride; and choleretic agents, such as tocamphyl and florantyrone, and fecal softeners, surfactants such as poloxalkol (Pluronic F–68), nonionic and dioctyl sodium sulfosuccinate, anionic.

The following examples set forth how to make and use the invention and the best mode contemplated of carrying out the invention but are not to be construed as limiting.

EXAMPLE 1 BIRD RATIONS

One percent by weight of diethylaminoethyl dextran (crosslinked type) was incorporated into the usual ration of cockerels. Five-week old cockerels were maintained for 4 days on the usual ration and on the rations with the added ingredients; the birds were sacrificed on the 5th day after an 18-hour fast. Serum sterol analyses were performed by the ferric chloride-sulfuric acid method of Zak et al., Anal. Chem. 26:776, 1954.

| Number of Cockerels | Ration | Serum Sterols mg. % |
|---|---|---|
| 6, 5 | Usual | 148,136 |
| 6, 5 | Usual + diethylaminoethyl dextran | 123,107 |

The data show advantageous lowering of the serum sterols, which are mainly cholesterol.

EXAMPLE 2 BIRD RATIONS

Usual bird ration for cockerels, this ration plus 2 percent by weight of cholesterol 2 various amounts by weight of diethylaminoethyl cross-linked dextran (DEAE Sephadex) were prepared. The procedure of example 1 was followed with the following results:

| Number of Cockerels | Ration | Serum Sterols (mg. %) |
|---|---|---|
| 6 | Stock | 125 |
| 6 | Stock 2% cholesterol | 258 |
| 6 | Stock 2% cholesterol + 0.1% DEAE Sephadex | 199 |
| 6 | Stock + 2% cholesterol + 0.5% DEAE Sephadex | 130 |
| 5 | Stock + 2% cholesterol + 1% DEAE Sephadex | 104 |
| 5 | Stock + 2% cholesterol + 5% DEAE Sephadex | 84 |
| 5 | Stock + 2% cholesterol + 10% DEAE Sephadex | 76 |

The data show advantageous lowering of cholesterol levels in the blood.

EXAMPLE 3 BIRD RATIONS

The procedure of example 2 was followed using the stock diet, stock diet plus 2 percent by weight of cholesterol, and the stock diet plus 2 percent cholesterol with added active ingredients.

| Number of Cockerels | Ration | Serum Sterols (mg. %) |
|---|---|---|
| 5 | Stock | 138 |
| 5 | Stock + cholesterol | 339 |
| 5 | Stock + cholesterol + 1% DEAE Sephadex | 123 |
| 6 | Stock + cholesterol + 1% DEAE cellulose | 270 |
| 6 | Stock + cholesterol + 1% Guanidoethyl cellulose | 231 |

The data show advantageous lowering of serum sterols, i.e. cholesterol, in the sera of the treated birds.

EXAMPLE 4 HARD GELATIN CAPSULE

One thousand two-piece hard gelatin capsules for oral use, each containing 500 mg. of DEAE Sephadex HCl, are prepared from the following ingredients:

| | |
|---|---|
| DEAE Sephadex HCl, 300–500 mesh | 500 g. |
| Talc U.S.P. | 50 g. |
| Magnesium stearate U.S.P. | 2 g. |

The finely powdered ingredients are mixed thoroughly, then filled into hard gelatin capsules of appropriate size.

Two capsules are taken four times a day with meals and an evening snack to lower blood cholesterol in hypercholesteremic patients.

The activity of the above formulation is improved by the addition of a finely powdered surfactant such as a propylene oxide-propylene glycol condensate (Pluronic F–68). The addition of 100 g. of Pluronic F–68 produces a capsule containing 500 mg. of DEAE Sephadex HCl and 100 mg. of Pluronic F–68.

EXAMPLE 5 POWDER PACKETS

Ten thousand powder packets, each containing 3.75 g. of DEAE Sephadex HCl, are prepared from the following:

| | |
|---|---|
| DEAE Sephadex HCl finely powdered | 37,500 g. |

One or two packets emptied and stirred into water, fruit or vegetable juices, skimmed milk, or mixed with cereal, applesauce or other food, is given three times daily with meals in the relief of severe pruritis associated with bile stasis such as in biliary cirrhosis with incomplete biliary obstruction.

EXAMPLE 6 OIL SUSPENSION

One thousand milliliters of an oral suspension containing 750 mg. of DEAE Cellulose in each 5 ml. is prepared from the following ingredients:

| | |
|---|---|
| DEAE Cellulose hydrochloride (200–300 mesh) | 150 g. |
| Oil base q.s. | 1,000 ml. |

The oil base consists of equal parts of soybean oil and purified linseed oil gelled with 1 percent aluminum monostearate. Each 5 ml. of base supplies 1.1 ml. of unsaturated linolenic acid.

One or two teaspoonfuls (5 or 10 ml.) administered three times a day with meals is useful in the treatment of atherosclerosis.

EXAMPLE 7 AQUEOUS FLUID

An aqueous oral fluid, containing in each 5 ml., 1,000 mg. of DEAE Dextran HCl, is prepared from the following materials:

| | |
|---|---|
| DEAE Dextran HCl | 2,000 g. |
| Methylparaben, U.S.P. | 7.5 g. |
| Propylparaben, U.S.P. | 2.5 g. |
| Saccharin sodium | 12.5 g. |
| Cyclamate sodium | 2.5 g. |
| Glycerin | 3,000 ml. |
| Tragacanth powder | 100 g. |
| Orange oil flavor | 10 g. |
| F. D. and C. orange dye | 7.5 g. |
| Deionized water, q.s. | 10,000 ml. |

One teaspoonful (5 ml.) three times a day with meals is useful in reducing blood cholesterol in hypercholesteremic individuals.

EXAMPLE 8 AQUEOUS SUSPENSION

An aqueous oral suspension, containing in each tablespoon (10 ml.) 1,000 mg. of guanidoethyl (GE) cellulose, is prepared from the following materials:

| | |
|---|---|
| GE cellulose, micronized | 1,000 g. |
| Pectin, N.F. | 100 g. |
| Deionized water, q.s. | 10,000 ml. |

One tablespoon (10 ml.) is given three times a day, with meals, to lower blood cholesterol in hypercholesteremic individuals.

EXAMPLE 9 Aqueous Suspension

An aqueous oral suspension containing in each tablespoon 1,000 mg. of diethylaminoethyl (DEAE) cellulose is prepared from the following materials:

| | |
|---|---|
| DEAE cellulose | 1,000 g. |
| Methylcellulose 25 c.p.s., U.S.P. | 300 g. |
| Deionized water, q.s. | 10,000 ml. |

Similarly, suitable preparation of other cellulose derivatives are prepared by substituting for the 1,000 g. of DEAE cellulose, 1,000 g. of AE cellulose or 1,000 g. of PAB cellulose.

EXAMPLE 10 TABLET

One thousand tablets for oral use, each tablet containing 1,000 mg. of DEAE Sephadex HCl is prepared from the following materials:

| | |
|---|---|
| DEAE Sephadex HCl (A-50), micronized | 1,000 g. |
| Methylcellulose, U.S.P. (15 c.p.s.) | 65 g. |
| Talc | 30 g. |
| Calcium stearate | 10 g. |

The Sephadex and talc are mixed well, granulated with a 7.5 percent solution of methylcellulose in water, passed through a No. 8 screen and dried carefully. The dried granules are passed through a No. 12 screen, mixed with the stearate and compressed into tablets.

Two tablets are chewed and then swallowed four times a day with meals and an evening snack to lower blood cholesterol in a hypercholesteremic individual.

Additional active ingredients, while not necessary to the embodiments of the inventive concept, can suitably be added thereto, for example, unsaturated fatty acids such as linoleic acid, arachidonic acid and linolenic acid; edible vegetable oils such as corn oil and safflower oil; choleretic agents such as tocamphyl and florantyrone; fecal softeners such as poloxalkol and dioctyl sodium sulfosuccinate; other hypocholesteremic agents such as the D-isomer of 3,3',5-triiodothyronine, tri-iodothyropropionic acid; thyroxine-like compounds such as sodium L-thyroxine and sodium D-thyroxine; nicotinic acid, clofibrate, nafoxidine hydrochloride, 5-methylpyrazole-3-carboxylic acid and 3-methyl-5-isoxazolecarboxylic acid.

EXAMPLE 11 COCKEREL RATIONS

Five-week old cockerels were maintained for 4 days on three separate rations, one ration being their usual ration, the second ration being the usual ration plus 2 percent by weight of cholesterol, and the third ration being the usual ration plus the cholesterol plus 1 percent by weight of diethylaminoethyl ether of cross-linked cornstarch. The cross-linked cornstarch was prepared from cornstarch and dichlorohydrin (1,3-dichloro-2-propanol) in the presence of sodium hydroxide. The diethylaminoethyl ether was prepared from the cross-linked cornstarch and β-chlorotriethylamine hydrochloride in the presence of sodium hydroxide.

On the fifth day, after an 18-hour fast, the birds were sacrificed and serum sterol analyses were performed by the ferric chloride-sulfuric acid method of Zak et al., Anal. Chem. 26:776 (1954).

| Regimen | Weight Gain (g./bird) | Food Intake (g./bird) | Wt. Gain/ Food Intake | Mean-Serum Sterols / mg./ 100 ml.) |
|---|---|---|---|---|
| Basal Diet | 109 | 226 | 0.48 | 138 |
| +2% cholesterol | 114 | 241 | 0.47 | 248* |
| +1% diethylaminoethyl ether of cross-linked corn starch | 109 | 227 | 0.48 | 188 |

*5 birds/group; others 6 birds.

EXAMPLE 12 COCKEREL RATIONS

Five-week old cockerels were maintained for 4 days on three separate rations, one ration being their usual ration, the second ration being the usual ration plus 2 percent by weight of cholesterol, and the third ration being the usual ration plus the cholesterol plus 1 percent by weight of diethylaminoethyl ether of cross-linked potato starch. The cross-linked potato starch was prepared from potato starch and dichlorohydrin (1,3-dichloro-2-propanol) in the presence of sodium hydroxide. The diethylaminoethyl ether was prepared from the cross-linked potato starch and β-chlorotriethylamine hydrochloride in the presence of sodium hydroxide.

On the fifth day, after an 18-hour fast, the birds were sacrificed and serum sterol analyses were performed by the ferric chloride-sulfuric acid method of Zak et al., Anal. Chem. 26:776 (1954).

| Regimen | Weight Gain (g./bird) | Food Intake (g./bird) | Wt. Gain/ Food Intake | Mean-Serum Sterols (mg./ 100 ml. |
|---|---|---|---|---|
| Basal Diet | 109 | 226 | 0.48 | 138 |
| +2% cholesterol | 114 | 241 | 0.47 | 248* |
| +1% Diethylaminoethyl ether of cross-linked potato starch | 106 | 224 | 0.47 | 172 |

*5 birds/group; other 6 birds.

I claim:

1. A process of lowering hypercholesteremia in mammals and birds which comprises the oral administration thereto of an effective amount of an amino, morpholino or guanidino anion exchange ether of a member selected from the group consisting of dextran, starch, cellulose, cellulose, cross-linked dextran, cross-linked starch, cross-linked cellulose, and cross-linked hydroxyethyl cellulose, the said cross-linked substances being water insoluble and containing ether bridges of the type —O—X—O— wherein X represents an alkylene having three to 10 carbon atoms, inclusive.

2. The process of claim 1 wherein the cross-linked substances contain ether bridges selected from the group consisting of —OCH$_2$CHOHCH$_2$O— and —OCH$_2$CHOHCHOHCH$_2$O—.

3. The process of claim 1 wherein the ether is selected from the group consisting of the diethylaminoethyl, aminoethyl, guanidoethyl, and para-aminobenzyl ethers.

4. The process of claim 1 wherein the ether is the diethylaminoethyl ether of cross-linked dextran containing ether bridges of the type —OCH$_2$CHOHCH$_2$O—.

5. The process of claim 1 wherein the anion exchange ether is selected from the group consisting of the diethylaminoethyl, aminoethyl, guanidoethyl and para-aminobenzyl ethers of dextran and cellulose.

6. The process of claim 1 wherein the ether is the diethylaminoethyl ether and the member is dextran.

* * * * *

UNITED STATES PATENT OFFICE
CERTIFICATE OF CORRECTION

Patent No. 3,627,872        Dated December 14, 1971

Inventor(s) THOMAS M. PARKINSON

It is certified that error appears in the above-identified patent and that said Letters Patent are hereby corrected as shown below:

Column 1, line 72, "know" should read -- known -- . Column 5, line 48, "mg.%)" should read -- (mg.%) -- ; line 59, "2 various" should read -- and various -- ; line 68, "Stock 2%" should read -- Stock + 2% -- ; line 69, "Stock 2%" should read -- Stock + 2% -- . Column 8, lines 20-22, "Sterols/mg./100 ml.)" should read -- Sterols (mg./100 ml.) -- ; lines 55-56, "(mg./100 ml." should read -- (mg./100 ml.) -- ; line 73, "cellulose, cellulose" should read -- cellulose, hydroxyethyl cellulose -- .

Signed and sealed this 22nd day of January 1974.

(SEAL)
Attest:

EDWARD M. FLETCHER, JR.        RENE D. TEGTMEYER
Attesting Officer              Acting Commissioner of Patents